United States Patent [19]

Ito

[11] 4,115,760
[45] Sep. 19, 1978

[54] FIGURE PRE-PROCESSING DEVICE

[75] Inventor: Chiaki Ito, Yokohama, Japan

[73] Assignee: Fujitsu Limited, Kawasaki, Japan

[21] Appl. No.: 796,366

[22] Filed: May 12, 1977

Related U.S. Application Data

[63] Continuation-in-part of Ser. No. 631,149, Nov. 11, 1975, abandoned.

[30] Foreign Application Priority Data

Nov. 18, 1974 [JP] Japan .................................. 49-133057

[51] Int. Cl.² ............................................. G06K 9/00
[52] U.S. Cl. ........................................ 340/146.3 H
[58] Field of Search ............. 340/146.3 H, 146.3 MA, 340/146.3 AG, 146.3 AC, 146.3 AQ

[56] References Cited

U.S. PATENT DOCUMENTS

| 3,846,754 | 11/1974 | Oka et al. ..................... 340/146.3 H |
| 3,940,737 | 2/1976 | Beun .............................. 340/146.3 H |
| 3,999,161 | 12/1976 | Van Bilzem et al. ...... 340/146.3 MA |
| 4,003,024 | 1/1977 | Riganati et al. .............. 340/146.3 H |
| 4,034,344 | 7/1977 | Saraga et al. ................. 340/146.3 H |

Primary Examiner—Joseph M. Thesz
Attorney, Agent, or Firm—Daniel Jay Tick

[57] ABSTRACT

The figure reducers of a figure pre-processing device are connected in series. A plurality of previously determined deletion judging patterns are classified into a plurality of groups and the picture signal pattern is compared with the previously determined judging patterns wherein the point focused on is excluded from a group in accordance with patterns rotated a predetermined angle around a point on a figure to be scanned. The classified groups are supplied to the series-connected figure reducers as a deletion judging pattern for deleting a point in each of the figure reducers.

1 Claim, 13 Drawing Figures (A)

PORTION DELETED BY PRIMARY FIGURE REDUCER

INPUT PICTURE SIGNAL

SECONDARY FIGURE REDUCER OUTPUT

FIGURE PRE-PROCESSING DEVICE

BACKGROUND OF THE INVENTION

This is a continuation-in-part of application Ser. No. 631,149, filed Nov. 11, 1975, for Figure Pre-Processing Device now abandoned.

The present invention relates to a figure pre-processing device. More particularly, the invention relates to a figure pre-processing device of a figure recognition system. The figure pre-processing device of the invention functions to extract the center line, or core line, of the segments composing a figure, character, symbol, or the like, from a quantized picture signal.

The present invention is not limited to the aforedescribed purpose only. However, for example, a figure character, or the like, particularly a handwritten character pattern, is composed of a plurality of segments. It is known that various analyses may be accomplished with facility by obtaining the core line pattern by adopting the figure reducing processing to figures consisting of a plurality of segments. In other words, figures, characters, or the like, are usually composed of a plurality of segments having a certain or specific thickness or width. The thickness of the segments changes considerably, even when considering the same character in accordance with various conditions. For this reason, when a character is recognized by determining distinctive features from the relative positional relations and connecting conditions of the segments, the existing position of a segment becomes apparent. The processing is considerably facilitated by extracting the features of the core line pattern obtained from the extraction of the center line, or core line, after each segment is reduced to a specific thickness.

In general, known segment reducing processing is accomplished in the following manner. The bright and dark picture signals obtained by scanning a figure or character optically are quantized and digitalized to "0" and "1". The condition of the point to be scanned and its neighborhood is compared with a plurality of previously determined and previously prepared patterns. As a result of the comparison, when a certain point is judged to exist at the periphery, rather than at the center, of a segment having a certain thickness, such point is deleted, or made "0". In known reducing processing devices, however, there is a disadvantage that if a certain point is considered to be deleted, this point remains undeleted when judging the succeeding points and is used as a part of the bright/dark pattern around the point to be scanned. This results in the deletion of a point which should not be deleted, and causes the missing of a segment in some cases.

The invention is an improvement over the segment reducing means for the aforedescribed purpose.

The principal object of the invention is to provide a figure pre-processing device which overcomes the disadvantages of known figure pre-processing devices, such disadvantages including the missing of a segment due to excessive reduction of the segment in existing line reducing devices.

Another object of the invention is to provide a figure pre-processing device of simple structure, which is inexpensive in manufacture and readily incorporated into new and existing figure recognition systems.

Still another object of the invention is to provide a figure pre-processing device which provides reduction processing of a figure, character, or the like, without missing any segments.

Yet another object of the invention is to provide a figure pre-processing device which functions efficiently, effectively and reliably to recognize a figure, character, symbol, or the like, with accuracy.

Another object of the invention is to provide a figure pre-processing device of simple structure, which is inexpensive in manufacture, overcomes the disadvantages of known figure pre-processing devices, and functions with great efficiency to recognize a figure, character, symbol, or the like.

BRIEF SUMMARY OF THE INVENTION

In the figure pre-processing device of the invention, the reducing means is divided into several steps, and the point considered to be deleted at a specified step is actually deleted. The reducing processing then proceeds to the next step. For this purpose, the deletion condition pattern is adequately divided for each step. There is no missing of any segment.

In accordance with the invention, a figure pre-processing device of a figure recognition system consists of scanning means for scanning a figure and providing a picture signal in accordance with the scanning. Quantizing means connected to the scanning means quantizes the picture signal into "0" and "1" signals. Figure reducing means connected to the quantizing means focuses on each point of the figure to be scanned and deletes in accordance with such focusing a picture signal of a point focused on when the picture signal pattern of points around the point is equal to any of a plurality of previously determined patterns. The figure pre-processing device of the invention comprises a plurality of figure reducing circuits included in the figure reducing means of the figure pre-processing device. The figure reducing circuits are connected in series. Each of the figure reducing circuits includes storing and comparing means for deletion judging patterns classified into a plurality of groups and for comparing the picture signal pattern with the previously determined judging patterns wherein the point focused on is excluded from a group in accordance with patterns rotated a predetermined angle around the point focused on. The classified groups are supplied to the series-connected figure reducing circuits as a deletion judging pattern for deleting a point in each of the figure reducing circuits. The judging patterns in each of the figure reducing circuits are different from those of the others.

Each of the figure reducing circuits comprises shift register means for shifting the picture signal provided in series by the quantizing means or provided by another of the figure reducing circuits in synchronism with the scanning of the scanning means. Each of the shift register means has a plurality of parallel outputs from a plurality of previously determined bit positions corresponding to each point of a picture signal pattern of points around the point focused on.

The storing and comparing means is supplied with the picture signal corresponding to each point of the picture signal pattern at points around the point focused on as the address. The storing and comparing means has a memory area of the address corresponding to the deletion judging pattern and stores in said memory area information instructing the deletion of the picture signal of the point focused on.

The predetermined angle is 180°.

The storing and comparing means comprises read only memory means.

The storing and comparing means provides a "0" signal upon comparison and a "1" signal upon non-comparison.

BRIEF DESCRIPTION OF THE DRAWINGS

In order that the invention may be readily carried into effect, it will now be described with reference to the accompanying drawings, wherein:

FIGS. 3a and 3b show a plurality of ambient picture signal pattern groups of a point focused on;

In the FIGS., the same components are identified by the same reference numerals.

DETAILED DESCRIPTION OF THE INVENTION

Figure 1:
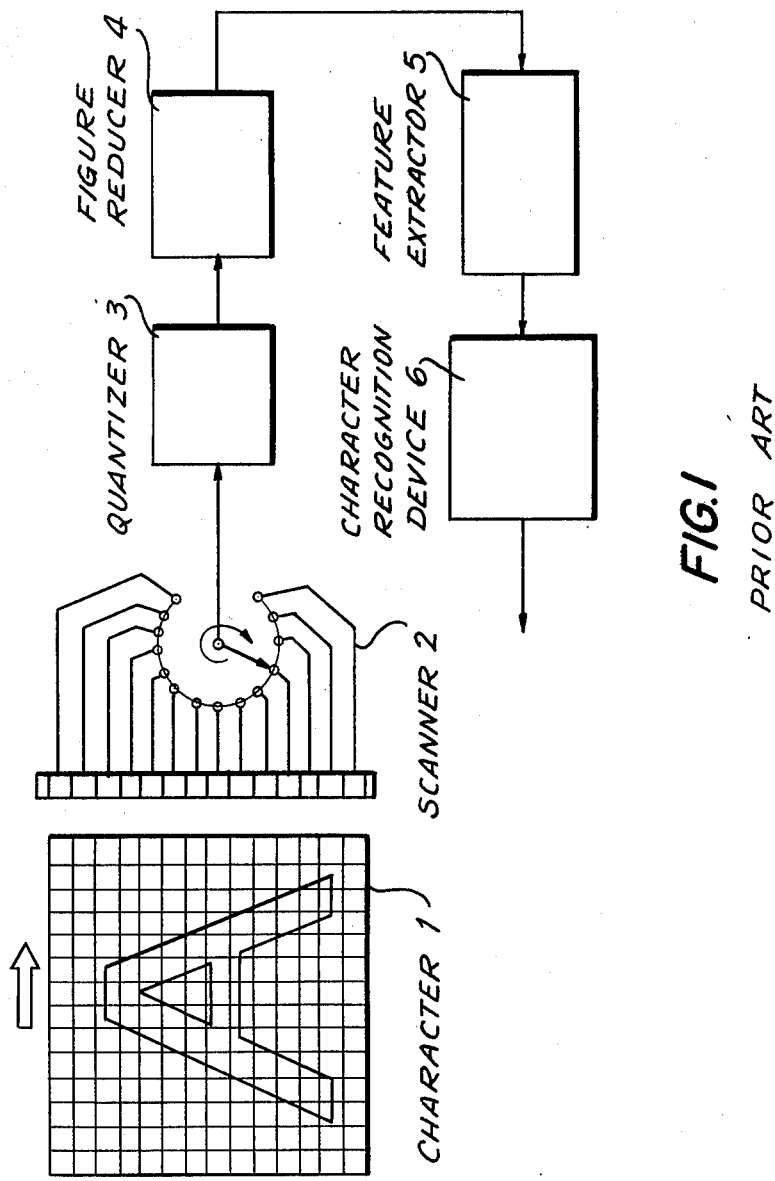
FIG. 1 is a block diagram of a known figure recognition system.

FIG. 1 is a block diagram of a known figure recognition unit. In FIG. 1, a figure, character, symbol, or the like, 1, is graphically recorded and is to be recognized. A scanner 2, of any suitable known type, scans the figure or character 1. A quantizer 3, of any suitable known type, is connected to the scanner 2 and functions to quantize the bright and dark picture signal produced by said scanner into dark portion levels of "1" and bright portion levels of "0". A figure reducer 4, of any suitable known type, is connected to the quantizer 3. A feature extractor 5, of any suitable known type, is connected to the figure reducer 4 and functions to extract features, in accordance with a predetermined operation, from the core line pattern obtained by the reducing processing accomplished by the figure reducer 4. A character recognition device 6, of any suitable known type, is connected to the feature extractor 5 and provides character recognition.

The scanning of the figure or character 1 is carried out, for example, from bottom to top and from right to left, and the picture signal is also quantized on a time basis. The relevant figure or character is thus divided into a large number of figure elements, as shown in FIG. 1. The picture reducer 4 pays attention to a certain point, or picture element, and when the patterns of "0" and "1" of a total of eight points around said point coincide with any of a plurality of previously prepared deletion judging patterns, said point is considered to be deleted.

Figure 2A:
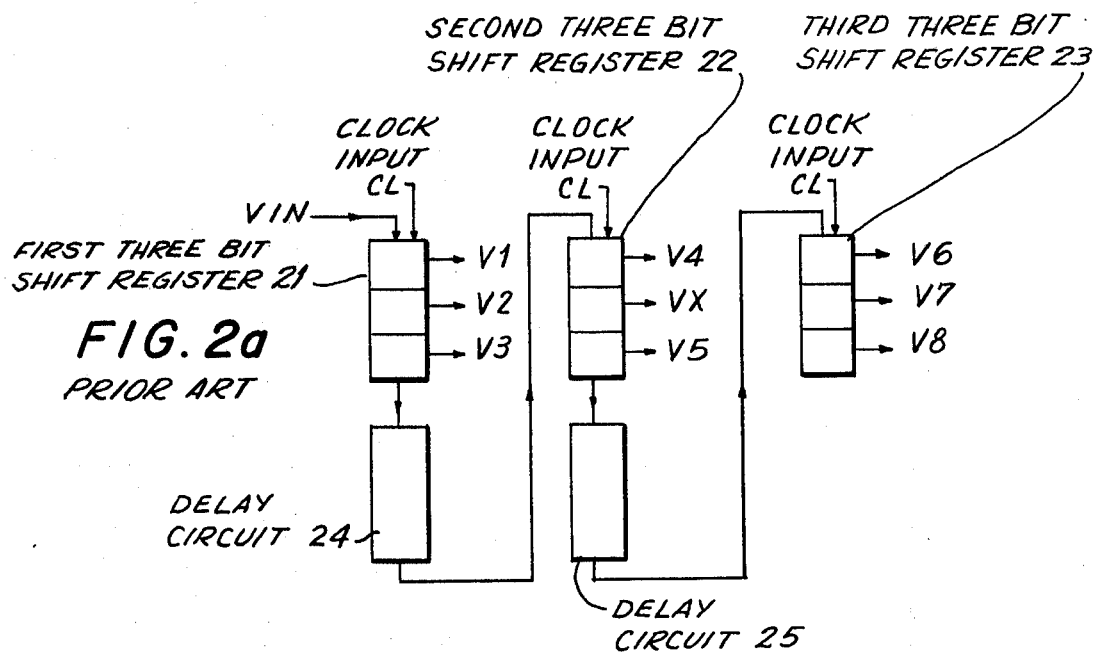
FIGS. 2a and 2b together form a single FIG., which is a block diagram of an embodiment of the figure preprocessing device of the figure recognition system of FIG. 1.
Figure 2B:
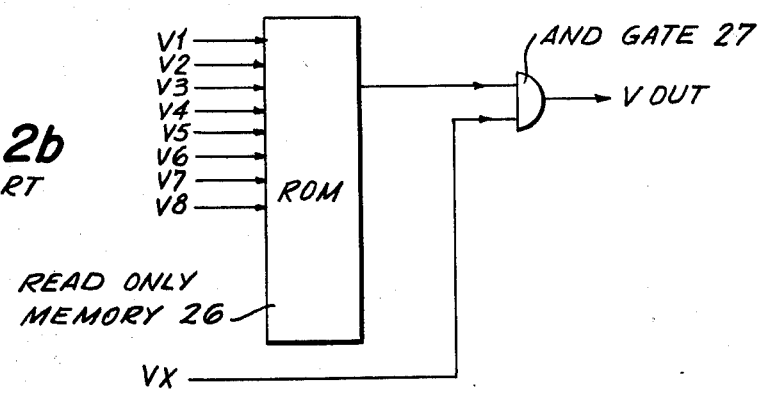

FIGS. 2a and 2b together form a block diagram of the figure reducing device 4 of the figure recognition system of FIG. 1. FIG. 2a is a block diagram of a circuit for observing the area of a 3 × 3 mesh. FIG. 2b is a block diagram of a focused point deleting circuit.

In FIG. 2a, the input VIN is supplied to a first three bit register 21. The input of a second three bit register 22 is connected to the first three bit register 21 via a delay circuit 24. The input of a third three bit register 23 is connected to the second three bit register 22 via a delay circuit 25. The first three bit shift register 21 has three outputs V1, V2 and V3. The second three bit register 22 has three outputs V4, VX and V5. The third three bit register 23 has three outputs V6, V7 and V8. A clock input CL is supplied to each of the shift registers.

In FIG. 2b, a read only memory ROM 26 has eight inputs V1, V2, V3, V4, V5, V6, V7 and V8 from the shift registers 21, 22 and 23. The output of the memory 26 is connected to one input of an AND gate 27. The output VX from the shift register 22 is connected to the other input of the AND gate 27. The circuit output VOUT is provided at the output of the AND gate.

Figure 3A:
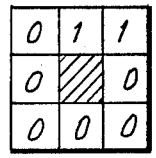
Figure 3A:
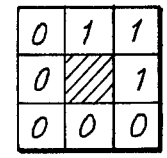
Figure 3A:
Figure 3A:
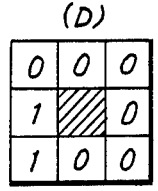
Figure 3A:
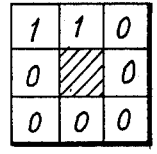
Figure 3A:
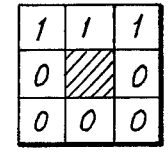
Figure 3A:
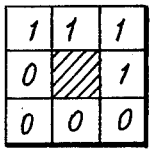
Figure 3A:
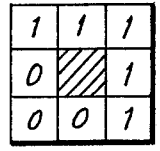
Figure 3A:
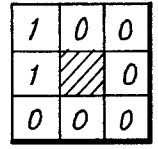
Figure 3A:
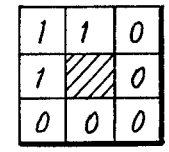
Figure 3A:
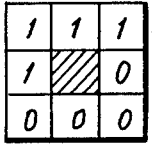
Figure 3A:
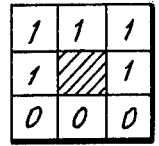
Figure 3A:
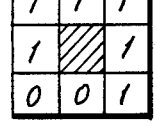
Figure 3A:
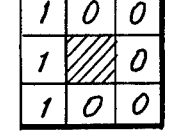
Figure 3A:
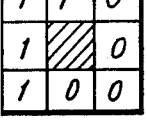
Figure 3A:
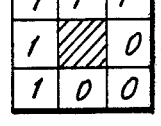
Figure 3A:
Figure 3A:
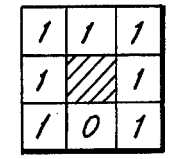
Figure 3A:
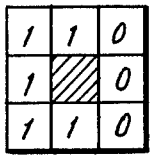
Figure 3A:
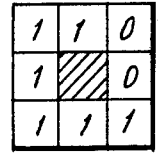
Figure 3A:
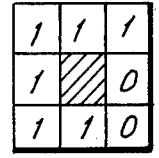
Figure 3A:
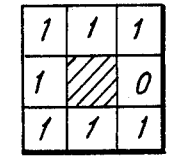
Figure 3B:
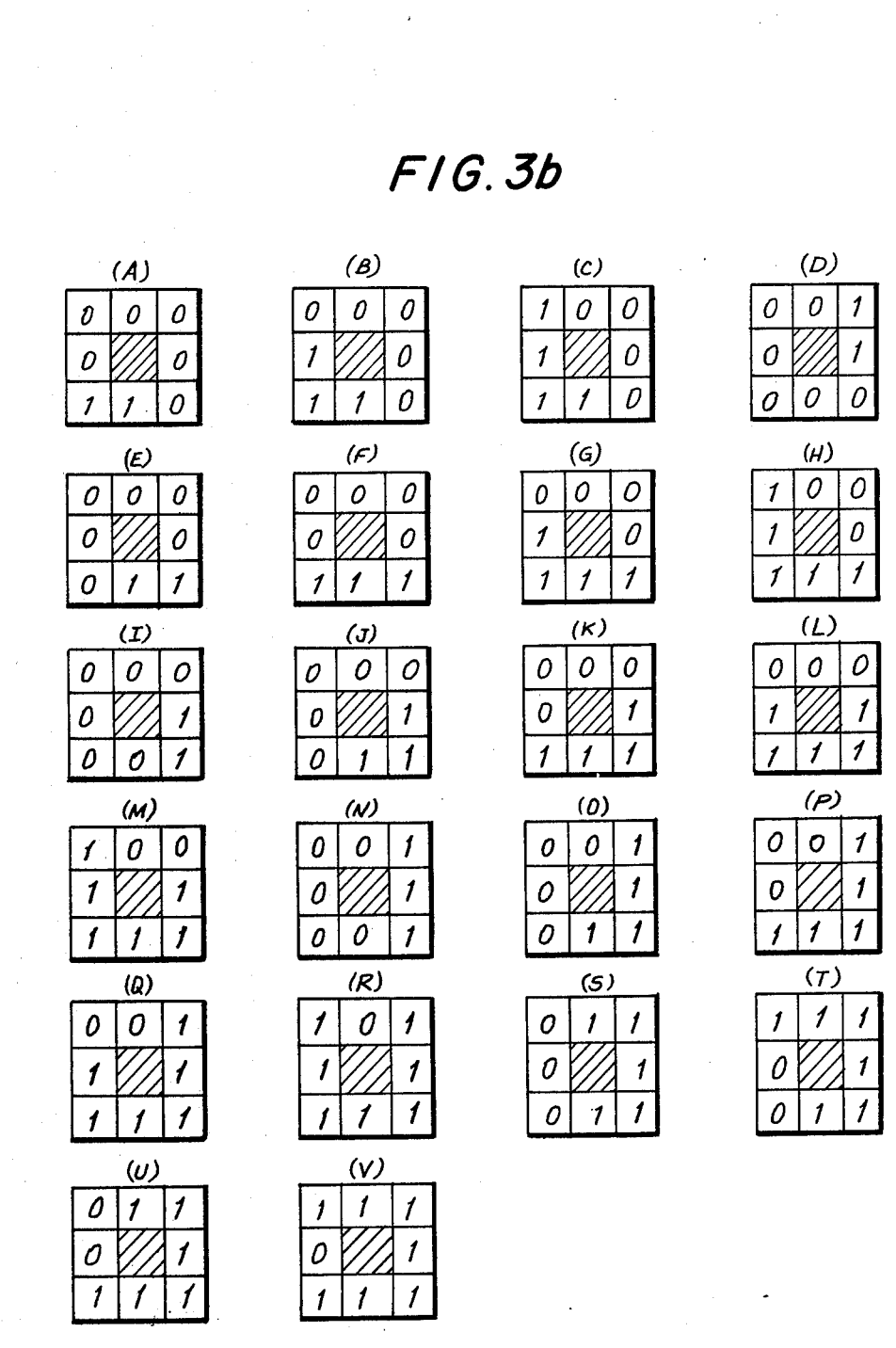

FIGS. 3a and 3b show 44 ambient picture signal patterns. The picture signal of the particular point, indicated by the oblique lined portion of each diagram, having the neighboring picture pattern which corresponds to any one of them, is deleted. In case of the present invention, the ambient picture signal pattern group is classified into pattern groups which become equal to each other when rotated by 180° or 180 radial degrees, for example, as shown in FIGS. 3a and 3b. That is, in the pattern of FIG. 3a, the left or top side of the focused point is "1", or black, whereas that of FIG. 3b is the right or bottom side. Thus, if the eight points of the pattern around the focused point are considered to be numbered clockwise, starting at the upper left point, the A pattern 01100000 of FIG. 3a becomes the A pattern 00000110 of FIG. 3b. The pattern of FIG. 3b is derived from that of FIG. 3a by moving each of the eight points 180 radial degrees or four points of the pattern either clockwise or counterclockwise. The focused point is the shaded central point.

Figure 4A:
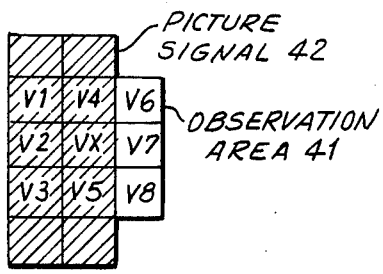
FIGS. 4a and 4b are for explaining reducing processing by known pre-processing devices.
Figure 4B:
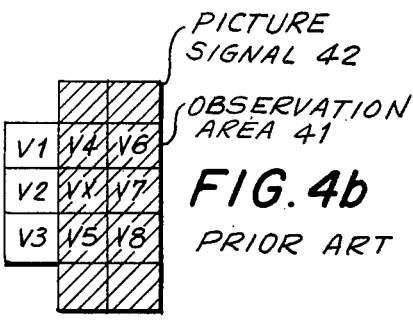

FIGS. 4a and 4b explain the known reducing processing. In FIGS. 4a and 4b, the observation area 41 is a 3 × 3 matrix and the picture signal is 42.

Figure 5:
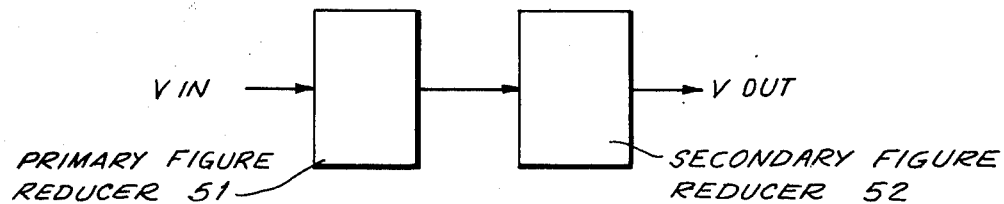
FIG. 5 is a block diagram of an enbodiment of the figure pre-processing device of the invention.

FIG. 5 shows the figure pre-processing device of the invention. The figure pre-processing device of FIG. 5 comprises a primary figure reducer 51 and a secondary figure reducer 52 connected to the output of said primary figure reducer. The input VIN is fed to the input of the primary figure reducer 51 and the output VOUT is derived at the output of the secondary figure reducer 52.

Figure 6A:
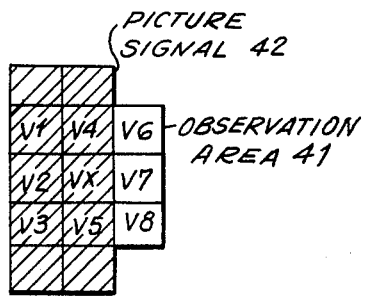
FIGS. 6a and 6b are for explaining the operation of the figure pre-processing device of FIG. 5.
Figure 6B:
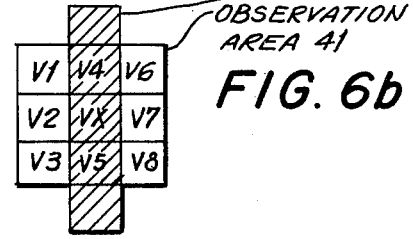

In FIGS. 6a and 6b, which explain the operation of the figure pre-processing device of FIG. 5, the observation area 41 is a 3 × 3 matrix, the picture signal is 42 and the output signal of the primary figure reducing device is 61.

Figure 7B:
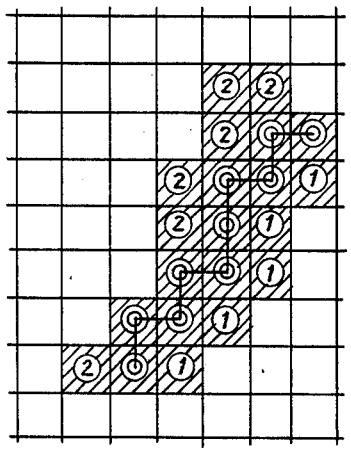
FIGS. 7a, 7b and 7c are for explaining the practical operation of the figure pre-processing device of the invention in reducing processing.
Figure 7A:
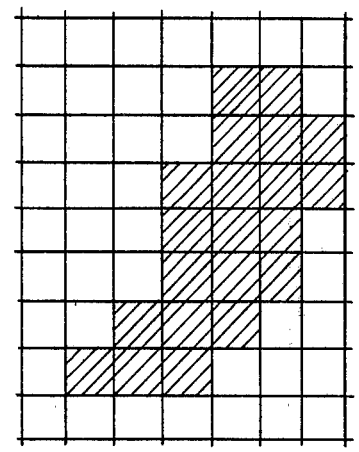
Figure 7C:
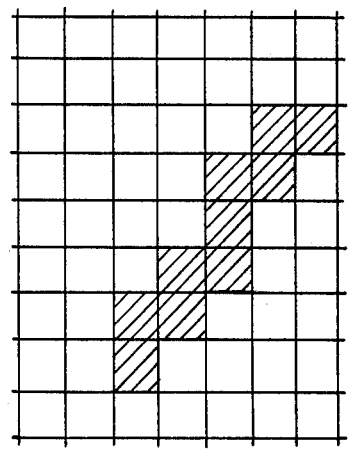

FIGS. 7a, 7b and 7c explain the practical operation of the reducing processing by the figure pre-processing device of the invention. FIG. 7a shows the input picture signal. FIG. 7b shows the portion deleted by the primary figure reducer and the secondary figure reducer. FIG. 7c shows the output of the secondary figure reducer.

The known method is explained in detail with regard to FIGS. 1, 2a, 2b, 3a, 3b, 4a and 4b. FIGS. 2a and 2b are a detailed block diagram of the figure reducer 4 of FIG. 1. The quantized picture signal VIN supplied from the quantizer 3 is first applied to the first shift register 21 and is shifted bit by bit in synchronism with the scanning of a picture element by a clock at the scanner 2. The signal is then fed to the second shift register 22 via the delay circuit 24. The signal is fed from the second shift register 22 to the third shift register 23 via the delay circuit 25.

The delay time is set so that the time required for passing the first shift register 21 and the delay circuit 24 becomes equal to the time for scanning from bottom to top at the scanner 2. This relation is also adopted to the second shift register 22 and the delay circuit 25. The signal of nine bits stored in the three shift registers 21, 22 and 23 therefore corresponds to the adjacent nine (3 × 3) picture elements on the practical figure or character. In FIG. 2a, the eight points, V1 to V8 are the adjacent points of the point or picture element VX at the center of the 3 × 3 matrix. The value of the points is supplied to the read only memory 26 of FIG. 2b as the address for judging whether or not the point VX is to be deleted.

The information "0" is stored in the memory area of the read only memory 26 for the 44 addresses shown in FIGS. 3a and 3b, among those addressed by V1 to V8. In other words, for example, the addresses V1 to V8 are given by "00010100". This corresponds to the pattern (A) shown in FIG. 3a. The information "0" is stored in the memory area for the relevant address of the read only memory 26. Therefore, when the addresses V1 to V8 correspond to the 44 patterns shown in FIGS. 3a and 3b, the output of the read only memory 26 becomes "0", and the AND gate 27 closes. Thus, there is no picture signal output for the particular point VX. Thereby, the output VOUT of the figure reducer 4 becomes "0" and the particular point is deleted. In the aforedescribed known method, however, when reducing processing is undertaken for a picture signal of two bits width, for example, as shown in FIGS. 4a and 4b, the segment is partly missing.

It is supposed that the ambient pattern for the particular point VX of FIG. 4a corresponds to the pattern (S) of FIG. 3a, and that said point is to be deleted. The picture signal of the point deleted is fed to the feature extractor or feature extraction circuit 5 of FIG. 1 in the form of "0". However, the picture signal still exists in the circuit of FIG. 2a. For this reason, when judging whether or not the next point is to be deleted as the particular point, the pattern becomes that shown in FIG. 4b. At such time, since the ambient picture signal pattern corresponds to the pattern (S) of FIG. 3b, this point is deleted, and only the picture signal "0" is fed to the feature extractor 5. Therefore, the picture signal of two bits width is completely deleted, missing a part of the segment.

In the figure pre-processing device of the present invention, as shown in FIG. 5, since the reducing processing is performed by dividing the first and second figure reducers 51 and 52 into the two stages, shown in FIGS. 2a and 2b, the aforedescribed disadvantage is overcome. That is, the information "0" is stored previously in only the memory area, for example, for the addresses corresponding to each pattern shown in FIG. 3a as for the read only memory of the primary figure reducer 51 of FIG. 5, while in the memory area for the addresses corresponding to each pattern of FIG. 3b as for the read only memory of the secondary figure reducer 52 of FIG. 5. Thus, the secondary figure reducer 52 performs the reducing processing for the output of the primary figure reducer 51.

The explanation of the operation of the figure pre-processing device of the invention is continued hereinafter with reference to FIGS. 6a and 6b. Determination or judging for deletion is first undertaken for the particular point VX of FIG. 6a by the primary figure reducer 51. The pattern thereby corresponds to the pattern (S) of FIG. 3a, so that the point VX is deleted. The signal is sequentially shifted downward in the shift register of the primary figure reducer 51. Therefore, one bit width at the right side of the picture signal 42 is all deleted. The primary figure reducing processing is thus completed and the picture signal turns out to be the core line of one bit, as shown by the primary figure reducer output signal 61 of FIG. 6b.

The secondary figure reducer then completes the reducing processing for the output of the primary figure reducer, that is, for the primary figure reducer output signal 61 of FIG. 6b. At such time, as shown in FIG. 6b, since the picture signal does not coincide at all with the pattern shown in FIG. 3b, the reducing processing is not performed and the picture signal of one bit, that is, the core line, is directly fed to the feature extraction circuit 5.

The reducing processing of the invention is explained with regard to FIGS. 7a, 7b and 7c. FIG. 7a shows the picture signal obtained by quantizing a part of the figure or character 1 of FIG. 1, by the quantizer 3, for each picture element, for example. The oblique lined areas correspond to the dark portion. That is, the signal corresponds to the portion of "1". Scanning is undertaken from bottom to top, and from right to left. Therefore, in this example, judging for deletion is first undertaken for the point which is the first from the right and the fourth from the top. The pattern around such point coincides with the pattern (O) of FIG. 3a. Such point is thereby deleted.

As hereinbefore mentioned, in FIG. 7b, the portion to be deleted by the primary figure reducer 51 of FIG. 5 is indicated by the number ①and the portion to be deleted by the secondary figure reducer 52 is indicated by the number ②. The portion remaining without deletion is indicated by concentric circles which are connected to each other. When the scanning of the second row from the right starts, the fourth point from the bottom coincides with the pattern (O) of FIG. 3a and said point is therefore deleted. The fifth point from the bottom is also deleted, since it coincides with the pattern (U) of FIG. 3a. In this case, the two points to be deleted, as hereinbefore mentioned, still remain as signals in the shift registers 22 and 23 for determining or judging deletion. For this reason, the deletion judging pattern of the fifth point from the bottom is not indicated by the pattern (O), but by the pattern (U) of FIG. 3a.

Thus, the signal of which the portion ①of FIG. 7b is deleted by the primary figure reducer is fed to the secondary figure reducer. When considering the undertaking of the judging for deletion of the point, first from the right and third from the top by using the secondary figure reducer, the signal shown in FIG. 7a is deleted, since it coincides with the pattern (C) of FIG. 3b. However, since the point, first from the right and fourth from the top is actually deleted by the foregoing process, there is no corresponding pattern. Thus, said point is not deleted by the secondary figure reducer and is provided as an output.

FIG. 7c shows the output of the secondary figure reducer obtained by the aforedescribed process. FIG. 7a is reduced from FIG. 7c into an almost perfect core line pattern.

As is obvious from the foregoing explanation, the primary and secondary figure reducers 51 and 52 of the figure pre-processing device of the invention can each reduce only one bit. Therefore, it is obvious that it is necessary to provide several pairs of the primary figure reducer and the secondary figure reducer in order to permit the extraction of a core line from a segment having a width of four bits, for example.

In accordance with the invention, as is understood from the foregoing explanation, the signal which is considered to be deleted when viewed from a certain direction is subject to the judging for deletion from the reverse direction by using the signal which is to be practically deleted. Thus, reducing processing of a figure may be completed without any missing of segments. The figure pre-processing device of the invention is thus very efficient for the recognition of a figure.

While the invention has been described by means of a specific example and in a specific embodiment, I do not wish to be limited thereto, for obvious modifications will occur to those skilled in the art without departing from the spirit and scope of the invention.

I claim:

1. A figure pre-processing device of a figure recognition system consisting of scanning means for scanning a figure and providing a picture signal in accordance with said scanning, quantizing means connected to the scanning means for quantizing said picture signal into "0" and "1" signals and figure reducing means connected to the quantizing means for focusing on each point of the figure to be scanned and deleting in accordance with such focusing a picture signal of a point focused on when the picture signal pattern of points around said point is equal to any of a plurality of previously determined patterns, said figure pre-processing device comprising a plurality of figure reducing circuits included in the figure reducing means of the figure pre-processing device, said figure reducing circuits being connected in series, each of said figure reducing circuits comprising shift register means for shifting the picture signal provided in series by the quantizing means or provided by another of said figure reducing circuits in synchronism with the scanning of the scanning means, each of said shift register means having a plurality of parallel outputs from a plurality of previously determined bit positions corresponding to each point of a picture signal pattern of points around the point focused on and storing and comparing means for storing deletion judging patterns classified into a plurality of groups and for comparing the picture signal pattern with the previously determined judging patterns wherein the point focused on is excluded from a group of the plurality of groups in accordance with patterns rotated 180 radial degrees around the point focused on, the classified groups being supplied to the series-connected figure reducing circuits as a deletion judging pattern for deleting a point in said figure reducing circuits, the judging patterns in each of the figure reducing circuits being different from those of the others, said storing and comparing means being supplied with the picture signal corresponding to each point of the picture signal pattern at points around the point focused on as the address, said storing and comparing means comprising read only memory means having a memory area of the address corresponding to the deletion judging pattern and storing in said memory area information instructing the deletion of the picture signal of the point focused on, the read only memory means of a first of the figure reducing circuits storing "0" in the words of an address corresponding to a predetermined number of the plurality of previously determined patterns and storing "1" in the other words so that said first of said figure reducing circuits deletes the point focused on only when the pattern around said point focused on is the same as any of the predetermined number of the plurality of previously determined patterns, and the read only memory means of the next-succeeding one of the figure reducing circuits storing "0" in the words of an address corresponding to a predetermined number of additional previously determined patterns derived from the plurality of previously determined patterns by rotating each of them 180° around the point focused on and storing "1" in the other words so that said next-succeeding one of said figure reducing circuits deletes the point focused on only when the pattern around said point focused on is the same as any of the predetermined number of additional previously determined patterns, no pattern of the group of additional previously determined patterns being the same as a pattern of the group of previously determined patterns from which it is derived.

* * * * *